United States Patent
Magielse (10) Patent No.: US 10,904,985 B2
(45) Date of Patent: Jan. 26, 2021

(54) LIGHTING CONTROL UTILIZING A SPEECH RECOGNITION SYSTEM

(71) Applicant: SIGNIFY HOLDING B.V., Eindhoven (NL)

(72) Inventor: Remco Magielse, Tilburg (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/632,473

(22) PCT Filed: Jul. 16, 2018

(86) PCT No.: PCT/EP2018/069267
§ 371 (c)(1),
(2) Date: Jan. 20, 2020

(87) PCT Pub. No.: WO2019/016135
PCT Pub. Date: Jan. 24, 2019

(65) Prior Publication Data
US 2020/0214112 A1    Jul. 2, 2020

(30) Foreign Application Priority Data

Jul. 19, 2017 (EP) .................................. 17182148

(51) Int. Cl.
| H05B 37/02 | (2006.01) |
| H05B 47/12 | (2020.01) |
| G10L 15/22 | (2006.01) |
| F21V 33/00 | (2006.01) |

(52) U.S. Cl.
CPC .............. *H05B 47/12* (2020.01); *G10L 15/22* (2013.01); *F21V 33/0056* (2013.01); *G10L 2015/223* (2013.01)

(58) Field of Classification Search
CPC .... G10L 15/265; F21V 33/0056; H05B 37/02
See application file for complete search history.

(56) References Cited

U.S. PATENT DOCUMENTS

| 7,080,014 | B2 * | 7/2006 | Bush | .................. G06F 3/167 704/275 |
| 9,462,663 | B2 * | 10/2016 | Aggarwal | ............ H05B 47/175 |
| 9,781,811 | B2 * | 10/2017 | Aggarwal | ............ H05B 47/175 |
| 9,877,375 | B2 * | 1/2018 | Aggarwal | ............ H05B 47/105 |

(Continued)

*Primary Examiner* — Thuy Vinh Tran
(74) *Attorney, Agent, or Firm* — Meenakshy Chakravorty (57) ABSTRACT

A method of controlling illumination emitted by one or more illumination sources of a lighting system is disclosed. The method comprises automatically performing operations of: receiving from a speech recognition system a first input indicative of a first speech command; in response to the first input, controlling the lighting system to transition from a first state comprising a first value of a parameter of the illumination to a second state comprising a second value of the parameter; receiving from the speech recognition system a second input indicative of a second speech command, the second input indicating that the second speech command specifies a further change in the parameter; mapping the second input to an adjustment defined at least in part based on the first and second values of the parameter; and controlling the lighting system to transition from the second state to a further adjusted state by adjusting the parameter.

13 Claims, 3 Drawing Sheets

(56) References Cited

U.S. PATENT DOCUMENTS

| | | |
|---|---|---|
| 2002/0044066 A1 | 4/2002 | Dowling et al. |
| 2011/0035029 A1 | 2/2011 | Yianni et al. |
| 2015/0061545 A1 | 3/2015 | Lee et al. |
| 2015/0221280 A1 | 8/2015 | Van Der Vleuten |
| 2016/0042531 A1 | 2/2016 | Nolan et al. |
| 2016/0286630 A1 | 9/2016 | Witzgall |
| 2016/0366746 A1 | 12/2016 | van de Ven et al. |
| 2018/0350363 A1* | 12/2018 | Cook ............. F21V 33/0056 |

* cited by examiner

FIG. 3

LIGHTING CONTROL UTILIZING A SPEECH RECOGNITION SYSTEM

CROSS-REFERENCE TO PRIOR APPLICATIONS

This application is the U.S. National Phase application under 35 U.S.C. § 371 of International Application No. PCT/EP2018/069267, filed on Jul. 16, 2018, which claims the benefit of European Patent Application No. 17182148.1, filed on Jul. 19, 2017. These applications are hereby incorporated by reference herein.

TECHNICAL FIELD

The present disclosure relates to the use of speech recognition in executing voice commands to control a lighting system.

BACKGROUND

Voice control is becoming more and more commonplace as a means by which a user can control various appliances around the home or even elsewhere, such as the office. For instance, a smart speaker is a speaker device embedded with a virtual digital assistant enabling the user both to control music played out through the speaker and also to conduct other functions, e.g. ordering take-out, making to-do lists, etc. Similarly, a virtual digital assistant is now often included in many other forms of user terminal such as smartphones, tablets, desktop and laptop computers, and wearable smart devices such as smart watches and smart glasses.

Voice based control is also becoming a means by which users can control utilities around the home or office. One such example is the use of speech to control a wirelessly connected lighting system. This may be achieved based on a dedicated voice recognition agent included in a component of the lighting system (e.g. a lighting bridge or wall panel in the case of a lighting system). Or increasingly, the control of the lighting system may be effected via a general-purpose digital assistant running on a user device, which is able to interface to the utility system via a wired or more often wireless (e.g. Wi-Fi, Bluetooth or ZigBee) connection between the user terminal and the utility system. As an example, the user can simply speak a voice command aloud in a room of his/her home, such as "dim lights to 70%" or "set atmosphere to cozy", and the virtual digital assistant on any suitable connected smart device in listening range (e.g. the user's smart speaker, mobile terminal, desktop PC or wearable device) will detect this and control the lights accordingly.

A virtual digital assistant (sometimes also just called a digital assistant or virtual assistant) may refer to any software agent employing speech recognition as a means by which a user can control functionality of any kind of appliance. The full functionality behind the virtual digital assistant may in principle be included in the same application on the local user device in question, but more often, the VDA is in fact a front-end client application accessing a more sophisticated back-end service hosted on a server. Either way, the user's interface to the agent is through the particular user device on which the user has the VDA installed.

Voice control interfaces and voice enabled assistants have become extremely popular, common, and sought after in the last few years, and are now part of popular culture. In parallel with this, systems which can be controlled using voice commands, such as connected lighting systems, have also benefited from a surge in consumer interest. Far-field voice control for in-house applications is becoming accepted by more and more consumers. It appears that voice control will become the standard method for controlling many applications, and for some this may already be the case.

SUMMARY

Although voice control systems for smart home appliances can simplify the interaction between a human and a system, they are not currently able to implement some kinds of commands. For instance, in natural speech people often speak in relative or subjective terms. Another human being would be able to judge what the speaker intended to say. However, existing computing devices are not able to understand such commands.

Further, existing voice interfaces do not allow for intuitive fine-tuning of the light settings. This is particularly problematic when trying to control a pre-set lighting state and attempting to fine-tune that pre-set state.

To address such issues or similar, the present disclosure describes a mechanism whereby users can transition from a first light state to a second light state, and then fine-tune that second light state and its associated parameters using speech commands. For example these speech commands can be commands that would normally be considered to be contextual, subjective, or lacking in defined parameters, such as "a bit more" or "a bit less".

According to a first aspect disclosed herein, there is provided a method of controlling illumination emitted by one or more illumination sources of a lighting system, the method comprising automatically performing operations of: receiving from a speech recognition system a first input indicative of a first speech command recognized by the speech recognition system; in response to the first input, controlling the lighting system to transition from a first state comprising a first value of at least one parameter of the emitted illumination to a second state comprising a second value of said at least one parameter; receiving from the speech recognition system a second input indicative of a second speech command, the second input indicating that the second speech command specifies a further change in said parameter relative to said transition; mapping said second input to an adjustment defined at least in part based on the first and second values of said parameter; and controlling the lighting system to transition from the second state to a further adjusted state by adjusting the parameter by said adjustment.

Thus the method advantageously gives meaning to commands defined by the user in only a relative manner, by interpreting such commands in context of the first and second values of a preceding transition. For instance such commands can be interpreted relative to the context of the preceding scene change. The adjustment may be defined (at least in part) based on the sign and/or magnitude of the delta between the first and second values.

In embodiments, the second speech command specifies a direction of the further change but only relative to a direction of said transition, said second input indicating the relative direction; and said mapping comprises determining a sign of the difference between the second and first values, and setting a sign of said adjustment accordingly.

In embodiments, said mapping comprises defining a scale for said parameter based on the transition from the first to the second value of the parameter, and mapping said second input to an adjustment set relative to said scale.

In embodiments, the second speech command does not specify numerically a degree of the further change, and therefore neither does the second input; the defining of said scale comprises at least determining a magnitude of the difference between the first and the second value; and said adjustment is set as a fraction of said magnitude, the fraction being between but not equal to zero and one.

That is, the adjustment is set part way but not the full way along the interval between the first and second values. Note that where the present disclosure refers to a fraction between 0 and 1, this does not limit the fraction to being expressed in the computer or circuitry as a number on a scale from 0 to 1 in any given implementation. In general a fraction can be expressed as a value part way along any scale from a value representing zero to a value representing unity (e.g. 0 to 100%, or 0 to $2^n-1$ on an n-bit scale).

In embodiments, the defining of said scale comprises at least identifying from the second input that the further change reverses the direction of the transition from the first to the second value, and on condition thereof determining a range between the first and second values; and based thereon, said adjustment is constrained to being set only part way along said range between the first and second values.

I.e. when the user makes the non-objective adjustment to the second state, this should not cause the parameter to revert to less than its value in the first state.

The adjustment may be constrained by being constrained to being set as a fraction (between zero and unity) of the range between the first and second values. Alternatively the adjustment could be a predetermined amount but which is capped between the first and second values.

In embodiments, the first state comprises a respective first value of each a plurality of parameters, and the second state comprises respective second values of each of the plurality of parameters; the defining of said scale comprises fitting a line or curve through the first and second states in a two or more dimensional parameter space defined by the plurality of parameters.

In embodiments, said plurality of parameters comprises color channels of a color space.

In embodiments, the defining of said scale comprises identifying from the second input that the further change is in the same direction as the transition from the first to the second value, and if that direction is positive determining a range between the second value and an upper capability of the one or more illumination sources, or if said direction is negative determining a range between the second value and a lower capability of the one or more illumination sources; and said adjustment is constrained to being set part way between the second value and the upper or lower capability, respectively.

In embodiments, said mapping comprises setting said adjustment to a fraction of the difference between the second value and the upper or lower capability, respectively, said fraction being between but not equal to zero and one.

That is, the adjustment may be set part way but not the full way along the interval between the second value and the maximum or minimum.

Alternatively the adjustment could be a predetermined amount but which is capped between the upper or lower value, respectively.

In embodiments, the speech command defines a degree of the further change only through a subjective utterance, and said second input comprises an indication of the subjective utterance; and said mapping comprises selecting said adjustment in dependence on the subjective utterance based on a function mapping different possible subjective utterances to different respective potential adjustments.

The indication of degree may be subjective at least in that it is non-numerical (e.g. does not specify increase or decrease by 5%, or by 10 Lux, or such like). For example, the subjective indication may comprise a term such "a bit", "a little", "a lot", "much less", "much more", "quite", "nearly" etc.

In embodiments said function may comprise a look-up table. Alternatively said function comprises a learned model learned by a machine intelligence algorithm based on prior user feedback on previous trials of the method.

In embodiments, the first state comprises respective first values of a plurality of parameters; the second state comprises respective second values of said plurality of parameters; and the further change specified by the second speech command comprises at least one of said parameters but fewer than said plurality of parameters.

In embodiments, said at least one parameter comprises at least one of: a parameter controlling an intensity of the emitted illumination, and/or a parameter controlling a color of the emitted illumination.

For example the parameter may be a direct measure of the intensity itself, or a related measure such as luminance, brightness or power, etc.

For example the parameter may be color temperature; or a channel of a color space such as red, green or blue in an RGB color space, or hue or saturation in a YUV color space.

In embodiments, the first and second state each comprises a predefined lighting scene rendered by a plurality of illumination sources, the first state comprising a respective first value of at least one parameter of each of the plurality of illumination sources, and the second state comprising a respective second value of the at least one parameter for each of the plurality of illumination sources; and said mapping comprises mapping said second input to a respective adjustment defined at least in part based on the respective first and second values of said parameter for each of the illumination sources; and said adjusting comprises adjusting the parameter by the respective adjustment for each of the illumination sources.

According to a second aspect there is provided a computer program product comprising code embodied on computer-readable storage, configured so as when run on one or more processing units to perform the operations according to the first aspect or any embodiment thereof.

According to a third aspect there is provided a lighting control system comprising storage storing code and one or more processing units arranged to run said code, the code being configured so as when thus run to perform the operations according to the first aspect or any embodiment thereof.

According to another aspect disclosed herein, there is provided a system comprising said lighting control system and the lighting system. According to another aspect disclosed herein there is provided a control system comprising the lighting control system and the speech recognition system. According to another aspect disclosed herein there is provided a system comprising the lighting control system, speech recognition system and the lighting system.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

As mentioned, smart home systems including lighting systems can now be controlled by speech commands issued to a virtual digital assistant (VDA) or the like. Indeed, there has been a drastic increase in the number of platforms and applications that support voice control, and the number of digital assistants that can be triggered by voice control is increasing. However, when a user provides voice commands to a lighting system, he or she often leaves certain changes undetermined. As such, the execution of the command as the system interprets it may be undesirable.

Current voice control applications typically allow users to recall or activate content in their lighting system, such as lighting scenes. Another well-known control mechanism is that users send direct control commands to groups of lights. For example: 'switch on the lights in the kitchen', or 'set my lights in the living room to red'. However, the user has to provide the defined state and it is often not possible to deviate from that state.

The following describes a system and method whereby users can transition to a new light state (from a previous light state) and then fine-tune those light settings using commands such as "a bit more" or "a bit less".

That is, a user can transition from state A to state B, and can then fine-tune state B using a voice command. The voice command explicitly specifies one of either 'Increase' or 'Decrease', but not an objectively defined degree of the increase or decrease. The lighting system can then automatically compute what an 'increase' or 'decrease' should mean in the context of state A and state B.

For example, a speech command as recognized by a speech recognition system stipulates a first input which is used to control the lighting system such that it may transition from a first state A to a second state B. Each state comprises a value for at least one parameter of the emitted illumination. The speech recognition system may then recognize a second speech command such that a second input is provided to the lighting system. The second input indicates that the second command specified a further change to be made to state B. The further change relates to the same altered parameter of the transition from state A to state B. In this way an adjustment can be defined for the further change and based at least in part on the parameter values of state A and B. The lighting system can then execute a transition from the second state B to a further adjusted state by executing the defined adjustment.

E.g. in embodiments this may be achieved by: (a) determining a delta (e.g. color and/or intensity) between previous scene and current scene; and then (b) mapping a plus/minus function to a fraction of said delta such that selecting plus increases the delta (i.e. extrapolate) and the minus decreases the delta (i.e. move closer to, but not completely to, the previous scene).

As an example use case, the second speech command may be "a bit more". This command is recognized as an 'increase' statement. If state A is the starting point, and state B is the current state, a further change may then be executed such that parameters of state B are adjusted in keeping with the parameter value difference between state A and state B, and in a manner that increases this change.

Figure 1:
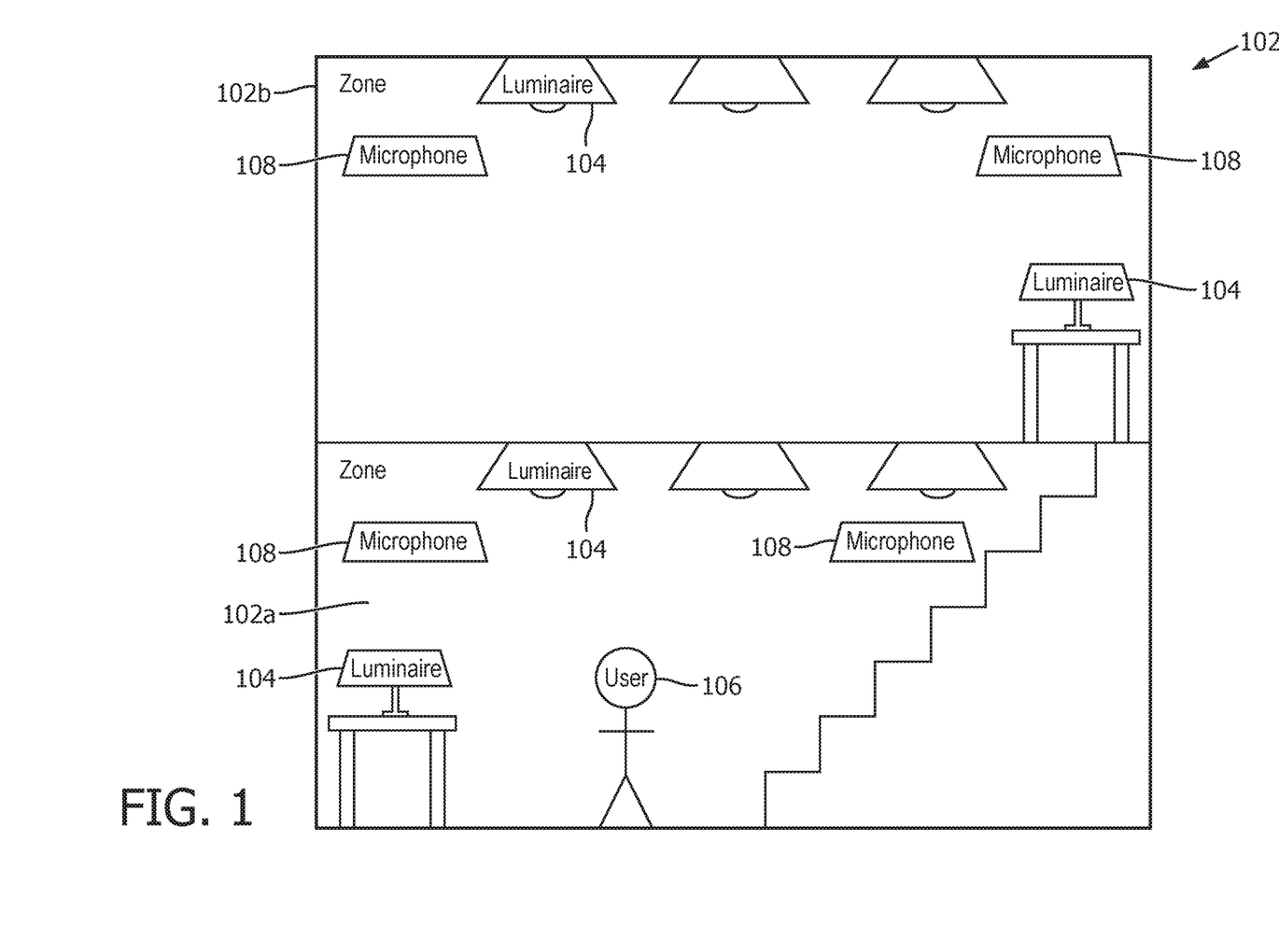
FIG. 1 is a schematic illustration of an environment comprising a lighting system.

FIG. 1 illustrates an example environment 102 in which embodiments disclosed herein may be employed. The environment 102 may take the form of an indoor space such as one or more rooms of a home, office or other building; an outdoor space such as a garden or park; a partially covered space such as a gazebo; or a combination of such spaces such as a campus or stadium comprising both indoor and outdoor spaces.

The environment 102 is equipped with a plurality of luminaires 104 installed or otherwise disposed at different locations throughout the environment 102. A luminaire may refer to any kind of illumination device for illuminating an environment or part of an environment occupied by a user 106, whether providing ambient lighting or task lighting. Each of the luminaires 104 may take any of a variety of possible forms, such as a ceiling or wall mounted luminaire, a free-standing floor or table luminaire, or a less traditional form such as a luminaire embedded in a surface or item of furniture (and the different luminaires 104 in the environment 102 need not take the same form as one another). Whatever form it takes, each luminaire 104 comprises at least one lamp (illumination element) and any associated housing, socket and/or support. Examples of suitable lamps include LED-based lamps, or traditional filament bulbs or gas discharge lamps.

The environment 102 is also equipped with one or more microphones 108 disposed at one or more locations throughout the environment 102. Each of the microphones 108 may take the form of a stand-alone microphone device, or alternatively a microphone integrated in another user device such as a static or mobile user terminal. Examples of user terminals having a microphone 108 which may be accessed for the present purposes include: a laptop or desktop computer placed around the home or office; a mobile terminal such as a smartphone or tablet; a wearable device carried or worn about the user's person; or a media device such as a smart speaker, smart television set or set-top box, home media center, etc. In another alternative or additional example, one or more of the microphones could each be embedded in a respective one of the luminaires 104.

In some scenarios the environment 102 may be divided into a plurality of different zones or localities 102a, 102b, such as different rooms, each illuminated by a different respective subset of one or more of the luminaires 104. It will be appreciated of course that the user's environment 102 may in fact comprise any number of rooms (e.g. living room, kitchen, hall, bathroom and multiple bedrooms in home; or multiple offices, hallways, a reception and a canteen or breakroom in an office building). Two are merely shown for illustrative purposes.

Figure 2:
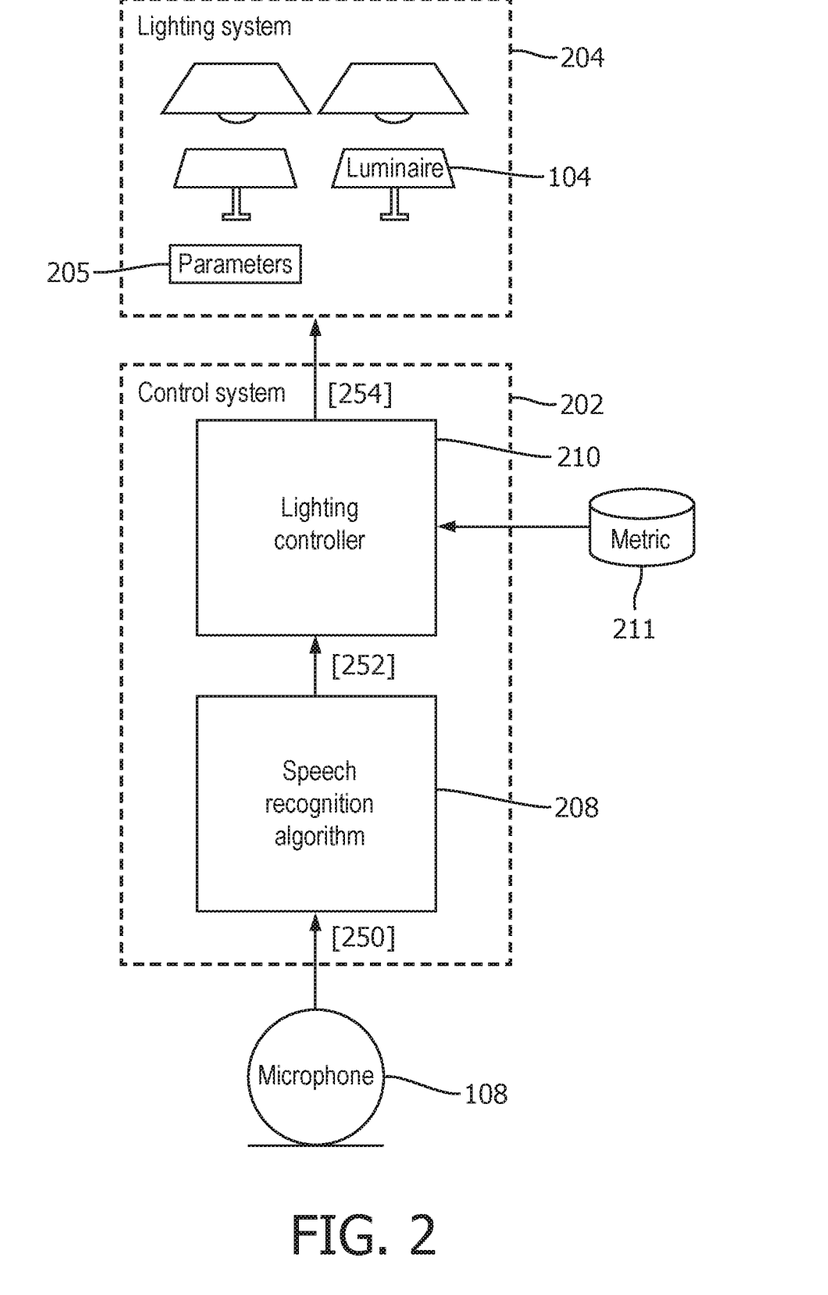
FIG. 2 is a schematic block diagram of an arrangement for controlling lighting.

FIG. 2 illustrates an arrangement enabling the user 106 to control the lighting emitted by one or more of the luminaires 104 based on speech commands spoken by the user 106 and captured by at least one of the one or more microphones 108. This may be to control the lighting in the same part of the environment 102a as that in which the user 106 speaks the voice command, or a different part 102b (e.g. in an upstairs room 102b while the user 106 is downstairs 102a).

The arrangement comprises a speech recognition algorithm 208, arranged to receive an audio signal captured by the at least one microphone 108 from the environment 102 or part thereof, wherein at times the audio signal will comprise a speech command spoken by the user 106 in the relevant part of the environment 102. The arrangement further comprises a lighting controller 210 coupled to the speech recognition algorithm 208 in order to receive an indication of control elements identified by the speech recognition algorithm in the received audio signal. The lighting controller 210 is also coupled to a lighting system 204 comprising the luminaires 104 discussed in relation to FIG. 1. The lighting system 204 has a state defined at least by a plurality of settings or parameters 205. The lighting controller 210 is arranged to adjust these settings 205 based on the identified control elements identified by the speech recognition algorithm 208, and can thereby control the lighting system 204 in dependence on the spoken speech command in order to adjust one or more aspects of the illumination emitted by the luminaires 104. For example this could be to turn the illumination from one or more of the luminaires 104 on or off, dim the illumination level up or down, adjust the color of the emitted illumination, or set a dynamic effect.

Settings 205 comprises values of parameters defining a state of the light system. That is to say at any point in time, the settings of any one or more lights of the light system may be stored as a state. When a user issues a first speech command the system stores the current state upon receipt of the command as state A. The target state, the state that has been requested by the first speech command, is stored as state B. For every continuous parameter that is adjusted when moving from state A to state B, the system can create a range scale. This scale is defined at the low end by the value specified in state A. At the high end it is limited by the capability of the lamp on that specific parameter. For example, brightness is constrained between 1 and 254. If state B has a brightness value of 254, the maximum value of the scale is 254. This example assumes that when transitioning from state A to state B the value of the parameter is increasing. If it should be that the transition reduces the value of a parameter, then the limitations will be reversed. That is to say, the scale will be defined at the upper end by the value specified in state A (e.g. 150), and the low end will be limited by the capability of the lamp (e.g. 1).

When a user subsequently issues a command directly after recalling State B they can move over the range scale by issuing a second speech command indicative of an increase or decrease command. When the user specifies a phrase indicating a decrease, the controller responds by adjusting the value of the parameter along the scale to a reduced amount. The amount may be a predefined percentage or fraction of the total range scale or some other defined range (for example, 5%, 10%, ½, ¾, etc.). Similarly, if the user issues a speech command indicative of an increase, the controller moves the value of the parameter along the scale to an increased amount as explained above with reference to decreasing along the scale.

In embodiments the controller 210 of the control system 202 is configured to automatically determine the location of the user 106, at least in terms of which of a set of discrete, predefined zones 102a, 102b (e.g. which room) the user 106 is currently found in.

Furthermore, in accordance with embodiments disclosed herein, the arrangement of FIG. 2 comprises a metric 211, stored in any suitable storage location, for determining the further adjustment to be carried out. By referring to the metric 211 the controller 210 is arranged to determine whether the control element received from the speech recognition algorithm 208 is for an increase or decrease in parameters of the current state. In embodiments this metric 211 may comprise a set of predetermined rules for relating the received input to a direction and/or a degree of change in one or more parameters of the current state. This may be a kind of dictionary from which relative or contextual terms can be converted into a mathematical value for use by the controller in controlling the lighting system. For example words like 'a bit' 'little' 'much more' 'much less' 'quite' 'nearly' 'a tiny bit' etc. This may be termed a subjective utterance. The subjective utterance provides the only indication of the degree of further change, and an indication of this is comprised within the second input 252 from the speech algorithm 210. The adjustment to be provided is then selected in dependence on this subjective utterance based on the function or rule given in metric 211. The function or rule 211 maps the different possible subjective utterances to different respective potential adjustments. For example, 'a bit' may map to 10%, 'a little' may map to 5%, 'much more' may map to 20%, 'nearly' may map to 2%, or 'a tiny bit' may map to 1%, etc.

In terms of physical implementation, each of the speech recognition algorithm 208 and lighting controller 210 may be implemented in the form of code (software) stored on a memory and arranged to run on a processing apparatus. The memory in which any given one of these modules 208, 210 is stored may comprise one or more memory units employing one or more memory media (e.g. electronic, magnetic or optical) housed in one or more devices at one or more geographic sites. The processing apparatus on which any given one of these modules 208, 210 is run may comprise one or more processing units housed in one or more devices at one or more geographic sites. Where required, distributed storage and processing techniques are in themselves known to a person skilled in the art.

In alternative implementations, it is not excluded that the speech recognition algorithm 208 and/or controller 210 may be implemented in the form of hard-wired circuitry, or configurable or reconfigurable hardware such as a PGA or FPGA, or any combination of hardware or software.

In whatever form implemented, each of these modules 208, 210 may be implemented in any one or more devices at any one or more of a variety of physical locations. The speech recognition algorithm 208 and controller 210 may be implemented in the same device as one another or in separately housed devices. Further, any given one of these could be implemented in a single device or distributed across multiple devices. Again it is noted that distributed computing techniques are in themselves known in the art.

For example, any one or both of the speech recognition algorithm 208 and controller 210 may be implemented in a user terminal such as a desktop computer, laptop, tablet or smart speaker disposed around the user's home or environment 102; or a dedicated component of the lighting system 204 such as a dedicated wall panel or smart light switch; or a portable user terminal such as a smart phone or tablet carried about the user's person; or a wearable device worn about the user's person; and/or a server at a remote location (the server comprising one or more server units at one or more geographic sites). One or both of the speech recognition algorithm 208 and controller 210 may be implemented as a distributed function embedded in each of the luminaires 104. The microphone(s) 108 may be incorporated in the same device as any one or more of the speech recognition algorithm 208, controller 210, and/or illumination sources, or in a different device or devices.

With regard to the illumination settings 205 and the metric 211 (i.e. the stored data structures), these again may be stored in any suitable storage location or locations. The storage in which any given one of these data structures 205, 211 is stored may comprise one or more memory units employing one or more memory media (e.g. electronic, magnetic or optical) housed in one or more devices at one or more geographic sites. The illumination settings 205 and/or metric 211 may be stored at the same storage location as one another or different locations, and at the same storage location as the speech recognition algorithm 208 and/or lighting controller 210 or a different location or locations. The device or devices in which this storage is implemented could be the same device(s) as any one of the previously recited components (e.g. microphones 208), and/or one or more separate devices (e.g. a user terminal of any kind described above, or a server comprising one or more server units at one or more geographic sites).

Where any of the modules 208, 210; devices 104 and data structures 205, 211 disclosed herein need to communicate externally with one another, and/or between different distributed parts of themselves, this communication may be implemented by means of any suitable wired or wireless connection or network, or combination of such. Examples of suitable wired technologies include Ethernet, DMX and the Internet. Examples of suitable wireless technologies include Wi-Fi, Bluetooth, ZigBee, etc. Wherever it is described herein that information is communicated from any one or more of the modules 208, 210; devices 104 and/or data structures 205, 211 to one or more others of these, it will be understood that this information could be communicated directly or vicariously. E.g. the information may be communicated by one or multiple hops, and may be communicated via any one or more intermediate devices or even via multiple constituent networks. Further, where it is said that information is communicated or such like, this refers to the substantive content or meaning of what is being communicated, rather than the format of the signal. Hence it is not excluded that the underlying information could be converted from one form to another during the communication. For instance, suppose contextual information is to be conveyed from another networked device in the environment 102 to the lighting controller 210 (e.g. from a lighting control device such as a wall panel, smart switch or control application running on a user terminal). This information may be sent via a server external to the environment 102, and may change in form between the originating device and the lighting controller 210. Nonetheless, information derived from the device in the environment 102 is still said to have been communicated from that device to the lighting controller 210.

Whatever form the physical implementation takes, the speech recognition algorithm 208 is configured to identify the meaning intended by the user 106 in a speech command spoken by the user in order to control one or more of the luminaires 104 in the lighting system 204.

A speech command herein refers to audio content 250 in the audio signal captured by the microphone(s) 108. A speech command typically comprises more than one spoken component each specifying a different aspect of the command. At least one of the components indicates the user's desire to control the lighting, this typically being the first element to be spoken chronologically, but not necessarily. For instance, a simple command may be "lights on". The first element "lights" indicates that the user wishes to control the lighting, and the second element "on" specifies the desired value of the parameter on/off. As another example, the command comprises at least three components: one expressing the desire to control the lights, one specifying a light parameter, and one specifying a location at which to effect the control. The specified light parameter may be for example: on/off, a change in dim level, a color parameter, or a name of a dynamic effect (i.e. a time-varying or spatio-temporal effect). E.g. the three components could be: "dim up . . . ", " . . . the lights . . . ", " . . . in the kitchen." In this example the first component specifies the parameter change to increase the overall intensity, the second component expresses the desire to control the lighting, and the third component specifies that the change is to be effected in the kitchen 102a only. Another example would be: "System, set the lights in the bedroom to a cozy color temperature". In this example the first component tells the speech recognition algorithm 208 that the user 106 intends to issue a lighting control command, the second component specifies the location for the control to be the bedroom 102b, and the third component specifies a color parameter (in this case expressed as a desired lighting atmosphere).

The speech recognition algorithm 208 may be a general purpose speech recognition algorithm implemented as part of a virtual digital assistant (sometimes just referred to as a digital assistant or virtual assistant). Alternatively the speech recognition algorithm 208 may be dedicated to lighting control. Either way, it may be configured to recognize the intention of the user 106 in each of the spoken components, e.g. based on keyword recognition, or based on more sophisticated techniques such as natural language processing (NLP). Speech recognition in itself is a known art. The speech recognition thus converts each recognized spoken component of the speech command into a corresponding control element, i.e. corresponding data items each being an abstracted representation of the intention of the user recognized from the respective component of the speech command.

The controller 210 receives from the speech recognition algorithm 208 an indication 252 of each of these recognized control elements. Based on these, the lighting controller 210 formulates a corresponding lighting control command 254, executable by the lighting system 204, to control one or more of the parameters 205 of the lighting system 204 in accordance with the indication 252 of the control elements received from the speech recognition algorithm 208. The lighting control command is executed by any suitable control component of the lighting system 204, e.g. an individual control unit in each luminaire 104, or a centralized control unit (not shown).

The processing of the speech command thus comprises at least two aspects: the recognition of the speech 250 by the speech recognition algorithm 208, and the formulation of the corresponding lighting control 254 command by the lighting controller 210.

A problem with the above-described scheme however is that the speech recognition algorithm 208 can only determine the user's meaning from the explicitly spoken components of the speech command, whereas in practice the user 106 often leaves one or more implied aspects of the command unspoken. If such a command is parsed some aspects may not be included in the lighting control command 254 correctly or at all. This may lead to unexpected behavior of the system or no behavior at all.

To address such situations, according to the present disclosure the lighting controller 210 is configured to assess the control elements 252 indicated from the speech recognition algorithm 208 relative to one or more rules defined in the metric 211, and based thereon to detect that a further adjusted state, beyond the transition previously performed from state A to state B, is desired. The lighting controller 210 will then map the second input to an adjustment defined at least in part based on the first and second values of parameter from states A and B. The lighting controller 210 can then control the lighting system to transition from the second state to a further adjusted state, adjusting parameters by the defined adjustment, and outputting a lighting control command 254 accordingly. The lighting control command 254 corresponding to the command implied but not explicitly stated by the user 106 in the speech command 250.

Below are described some example adjustments based on speech commands indicating the desire for an increase or decrease relative to a previous speech command. Different parameters may require ranges, scales, and direction of adjustment (i.e. in a positive or negative direction relative to the transition from state A to state B), to be set in dependence on different values.

Table 1 shows brightness and color temperature values for two states, state A and state B, and the range over which a further adjustment can be performed.

TABLE 1

| State A | State B | Range scale |
| --- | --- | --- |
| On: true | On: true | N/A (not continuous) |
| Brightness: 100 | Brightness: 200 | 100-254 |
| Color temperature: 3000K | Color temperature: 6000K | 3000-6000K |

Table 1 gives some parameters of two states, state A and state B. The 'On' parameter is not a continuous parameter, it does not change from state A to state B, and so no range scale is set. The 'Brightness' parameter is continuous and so a range scale is set as explained herein. The brightness may relate to a direct measure of intensity, or related measures such as luminance, or power, etc.

This example shows how when transitioning from state A to state B, the range scale the system generates is dependent thereon. In this example if the system is in state B and a speech command is issued to 'reduce', the system would decrease the brightness (for example to a value less than 200, e.g. 190) and decrease the color temperature (for example to a value less than 6000K, e.g. 5700K). The speech recognition indicative of a decreasing adjustment of the values of the parameters is determined by the controller 210 from the output 252 of the speech recognition algorithm 208 and the metric 211. As a result of this a direction of transition from state A to state B can be determined. In this example the transition is positive for both parameters. The determination of the desired adjustment as a 'decrease' in relation to this previous positive transition indicates a negative adjustment from state B to reach the desired further adjusted state. The second speech command thus specifies a direction of the further change but only relative to a direction of the transition (from state A to state B), and thus the input indicates a relative direction. Therefore mapping the second speech command to an adjustment in this case comprises determining a sign of the difference between the second and first values (i.e. the difference between values of state A and state B), and setting a sign of said adjustment accordingly.

In this example, in the case of a color transition the system operates in the same way. For example, when the first speech command indicates a transition from green to red, both green and red can have a fixed value for the system. The adjustment, based on the indication of the second speech command, can then be worked out relative to these two states and their parameter values.

In embodiments, where it is determined that the adjustment based on the second input from the second speech command results in a further change which reverses the direction of the transition from the first to the second value (from state A to state B), a range is defined between the first and second values. That is to say, the range defined is confined by the values of the states A and B, and limitations of the lamp are not considered. That is to say, the adjustment is constrained to being set only part way along said range between the first and second values.

In an example embodiment of the above, John arrives at home. The lights switch on via a motion sensor to a default state: brightness 100% and color temperature of 2700K. As John puts his coat on the rack he activates his relaxing scene, "set my relaxing scene". The system goes to a dimmed brightness of 60% and decreases the color temperature to 2200K. John says "a bit less", and the system increases the brightness to 65% and color temperature to 2300K.

In embodiments, the second speech command does not specify a degree of the further change numerically, and as such neither does the second input. In this situation the adjustment in the value of a parameter may be definable using the magnitude of the range. The range may be determined as between the parameter values of state A and state B. The adjustment in the value can then be determined as a fraction of the magnitude of the range, where the fraction as a decimal is between but not equal to zero and one. The same definition of the adjustment can be done where the range is determined as being between the values of the second value given by state B, and the upper or lower capability of the lamp.

It should be understood that a series of commands may be given where nothing but relative speech commands are provided by the user 106. For example, 'more', 'a bit more', 'a little bit more'. As a result of such a chain of subjective speech commands, the original range may need to be re-evaluated. However, the magnitude as taken from the determined range between the last two defined speech commands (i.e. where the speech command comprises defined values), may be maintained. That is to say, the range established between values for state A and state B may be maintained as basis for any further fractional or percentage based adjustments. In this way subsequent speech commands without defined values will be consistent with each other such that 'a bit more' is not taken from a different magnitude than 'more'. This allows for the user to have a more accurate perception of the changes being asked for and those being delivered.

Figure 3:
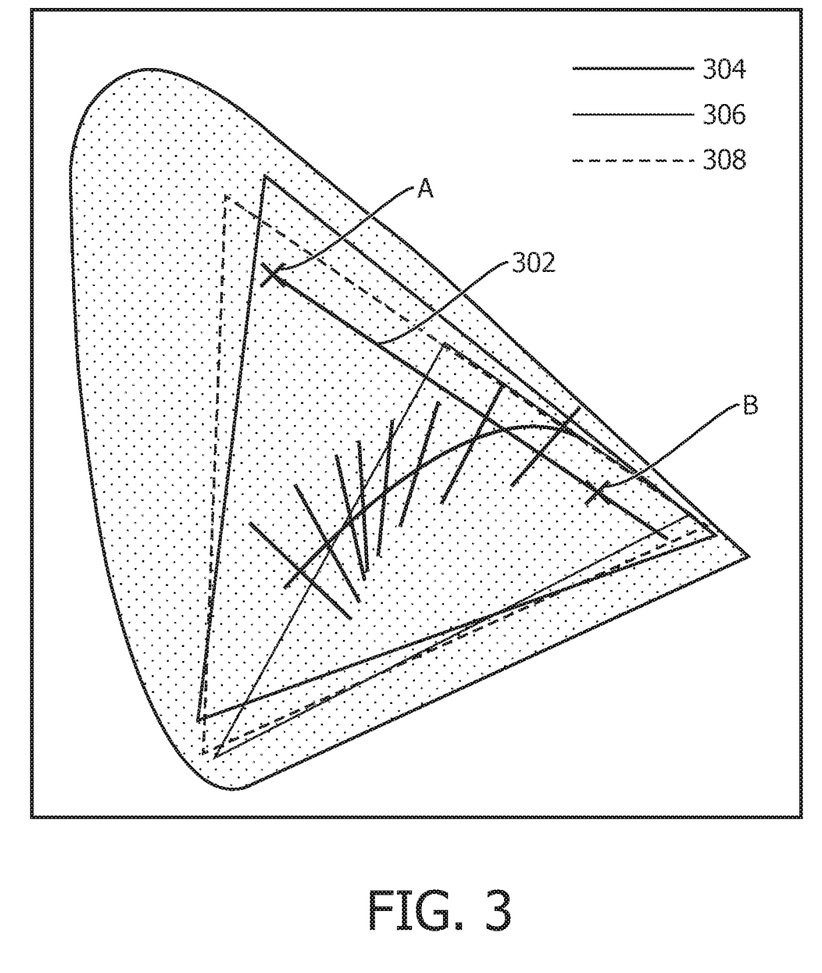
FIG. 3 shows a two dimensional representation of color using a color space chromaticity diagram.

With reference to FIG. 3 and table 2 an example of a color based adjustment is described.

TABLE 2

| State A | State B | Range scale |
| --- | --- | --- |
| On: true | On: true | N/A (not continuous) |
| Color: [x: 0.2293, y: 0.6206] (green) | Color: [x: 0.6519, y: 0.3114] (red) | 100-254 |

Table 2 gives some parameters of two states, state A and state B. The 'On' parameter is not a continuous parameter, it does not change from state A to state B, and so no range scale is set. In this example the color parameter is represented in x, y coordinate format based on the graph shown in FIG. 3.

The graph shown in FIG. 3 is a two dimensional representation of color called a color space chromaticity diagram. In embodiments, a plurality of parameters may be used, each for different color channels of a color space. FIG. 3 also comprises three color gamuts, 304, 306, and 308. A color gamut is the subset of colors which can be accurately represented in a given circumstance, such as within a given color space or by a certain device. In FIG. 3, gamut 308 is the color gamut of a particular illumination source, i.e. a particular lamp. The color rendering capability range of the illumination source represented by gamut 308 is set out by the edges of the triangle marked with the dashed line 308. Gamuts 304 and 306 represent other illumination sources. These may be other illumination sources in a common location and possibly for providing a scene, or other illumination sources for different functions altogether. It can be seen how when determining the capability range of an illumination source, and any adjustments based thereon, substantially different scales may be output for different illumination source and their respective adjustments.

With reference to table 2, state A and state B have been marked at the corresponding color coordinates in FIG. 3. Again in this example the transition is in the direction of state A (defining the initial state), to state B (defining the state as a result of the first input indicative of the first speech command). The range is then defined with the starting point of color A. The end of the range scale is defined by fitting a straight line (starting at color point A), through the color point of state B up to the end of the capabilities of the lamp, the edge of gamut 308. In embodiments defining the scale may comprise fitting a curve through two or more states.

In embodiments, the parameter space may comprise two or more dimensions defined by a plurality of parameters. In the present example, when the user says 'a little less' the color will move towards orange and yellow. That is to say the color will move back along the line 302 between points A and B, and towards point A. When the user says 'a little more' the color will move towards a deeper red, and even further away from green. That is to say the adjustment in this case causes the color to continue along the line 302 from point B, but in the same direction as the previous transition from point A to point B.

In an example embodiment of the above, John arrives at home. He says: "turn on the lights in my living room and set them to green". Sometime later he says "set my lights to red". The lights subsequently transition from green to red. John then says "a bit more". The lights go to a deeper red color.

With reference to table 3 an example of an adjustment between two scenes is described.

The above described control mechanism can also work for scene control. A scene is typically defined by a light state for a plurality of lamps. The method described herein thus creates a ranged scale for each lamp and for each parameter that is adjusted. The first and second state (states A and B), comprise a predefined lighting scene. The scene is rendered by a plurality of illumination sources. Therefore each state comprises a respective value of at least one parameter of each of the plurality of illumination sources. Thus the respective adjustment for each of the illumination sources is mapped onto the second input from the second speech command, where the respective adjustment is defined at least in part based on the respective first and second values of the at least one parameter (i.e. from state A and state B). Each of the respective illumination sources is then adjusted by their respective adjustment such that the parameter values are adjusted to provide the further adjusted state.

TABLE 3

| State A | State B | Range scale |
| --- | --- | --- |
| Lamp 1: | Lamp 1: | Lamp 1: |
| Value 1A | Value 1B | Value1A-Value 1B |
| Value 2A | Value 2B | Value2A-Value 2B |
| Value 3A | Value 3B | Value3A-Value 3B |
| Lamp 2: | Lamp 2: | Lamp 2: |
| Value 1A | Value 1B | Value1A-Value 1B |
| Value 2A | Value 2B | Value2A-Value 2B |
| Value 3A | Value 3B | Value3A-Value 3B |

Table 3 gives three parameters of two states, state A and state B, for two illumination sources (lamp 1 and lamp 2). A range is calculated based on each respective parameter value at each respective state for each respective illumination source. In this way the user can transition between scenes to varying degree, and fine-tune the final result.

In an example embodiment of the above, John arrives at home. He switches on the lights with a Hue Tap to a scene that represents a sunset. Later that evening he watches television and says "Set my television scene". The lights go to their correct states as defined by the recalled scene. It is a bit too dark for John, so he says "a bit less". The scene output changes such that the parameter values are a bit closer to the previous sunset scene.

In an example embodiment, the user may give a speech command which relates to only one, or only a few of the total parameters of a recalled scene. For example, if the scene has a number of parameters, the user may specify an adjustment with regards to only one of the multiple parameters, and thus the further adjustment will only comprise one value of one of the parameters that make up the scene. E.g. if after setting his television scene John says "a bit more red", only the value of the red channel parameter of the television scene will be adjusted. In this example the value will be adjusted based on the magnitude of change in the value of the red channel parameter between the previous sunset scene and the television scene. Similarly John may give a second speech command of "a bit brighter". In which case only the brightness parameter will be adjusted based on the respective brightness of the sunset and television scenes.

Various suitable localization technologies are in themselves familiar to a person skilled in the art and will not be repeated at length herein. A combination of techniques may also be employed in order to improve positioning accuracy.

Whatever technique is chosen, the detected location is thus made available to the controller 210. The localization algorithm could be included as part of the lighting controller 210, or more likely a separate location system, not shown (e.g. hosted on a server comprising one or more server units at one or more geographic sites).

The predetermined rule(s) of metric 211 may be defined by any suitable means. In some embodiments, one, some or all of the rules 211 may be defined by a manufacturer of the lighting system. Alternatively or additionally, one, some or all of the rules may be defined after installation of the lighting system, e.g. by a commissioning technician, or by the user 106 him- or herself. In the latter case, a suitable user device (e.g. desktop, laptop, tablet, smartphone or wearable device) is configured to provide a user interface enabling the user 106 to manually set one or more of the rules. This could be via a graphical user interface or the speech interface. The user device is further configured to access the rules database via any suitable wired or wireless connection or network (e.g. any of those described previously), and based thereon to set the rule(s) in accordance with the user's user input entered through the user device.

It will be appreciated that the above embodiments have been described only by way of example.

For instance, the metric 211 for predicting user intention is not limited to being implemented as a set of one or more predefined rules. In alternative or additional implementations, the metric 211 may comprise a learned knowledge model learned by a machine learning algorithm based on user input. In this case, when a user continually corrects a predefined scene using the same second speech command having the same second input and resulting adjustment, this may become the predefined scene. That is, after the same adjustment is provided to the same scene the learned knowledge that this is a preferred form of the predefined scene may be stored and used next time that scene is recalled.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of controlling illumination emitted by one or more illumination sources of a lighting system, the method comprising automatically performing operations of:
   receiving from a speech recognition system a first input indicative of a first speech command recognized by the speech recognition system;
   in response to the first input, controlling the lighting system to transition from a first state comprising a first value of at least one parameter of the emitted illumination to a second state comprising a second value of the emitted illumination of said at least one parameter;
   receiving from the speech recognition system a second input indicative of a second speech command, the second input indicating that the second speech command specifies a further change in said at least one parameter of the emitted illumination relative to said transition;
   mapping said second input to an adjustment of said at least one parameter of the emitted illumination defined at least in part based on the first and second values of the at least one parameter of the emitted illumination; and
   controlling the lighting system to transition from the second state to a further adjusted state by adjusting the at least one parameter of the emitted illumination by said adjustment; wherein:
   the second speech command specifies a direction of the further change but only relative to a direction of said transition, said second input indicating the relative direction; and
   said mapping comprises determining a sign of the difference between the second and first values, and setting a sign of said adjustment accordingly.

2. The method of claim 1, wherein:
   said mapping further comprises defining a scale for said at least one parameter based on the transition from the first to the second value of said at least one parameter, and mapping said second input to an adjustment set relative to said scale.

3. The method of claim 2, wherein:
   the second speech command does not specify numerically a degree of the further change;
   the defining of said scale comprises at least determining a magnitude of the difference between the first and the second value; and
   said adjustment relative to said scale is set as a fraction of said magnitude, the fraction being between but not equal to zero and one.

4. The method of claim 2, wherein:
   the defining of said scale comprises at least identifying from the second input that the further change reverses the direction of the transition from the first to the second value, and on condition thereof determining a range between the first and second values; and
   said adjustment relative to said scale is constrained to being set between the first and second values.

5. The method of claim 2, wherein:
   the first state comprises a respective first value of each of a plurality of parameters, and the second state comprises a respective second value of each of the plurality of parameters;
   the defining of said scale comprises fitting a line or curve through the first and second states in a two or more dimensional parameter space defined by the plurality of parameters.

6. The method of claim 5, wherein said plurality of parameters comprises color channels of a color space.

7. The method of claim 2, wherein:
   the defining of said scale comprises identifying from the second input that the further change is in the same direction as the transition from the first to the second value, and if that direction is positive determining a range between the second value and an upper capability of the one or more illumination sources, or if said direction is negative determining a range between the second value and a lower capability of the one or more illumination sources; and
   said adjustment relative to said scale is constrained to being set between the second value and the upper or lower capability, respectively.

8. The method of claim 7, wherein said mapping comprises setting said adjustment relative to said scale to a fraction of the difference between the second value and the upper or lower capability, respectively, said fraction being between but not equal to zero and one.

9. The method of claim 1, wherein:
   the second speech command defines a degree of the further change only through a subjective utterance, and said second input comprises an indication of the subjective utterance; and
   said mapping further comprises selecting said adjustment in dependence on the subjective utterance based on a function mapping different possible subjective utterances to different respective potential adjustments.

10. The method of claim 1, wherein:
the first state comprises respective first values of a plurality of parameters;
the second state comprises respective second values of said plurality of parameters; and
the further change specified by the second speech command comprises at least one of said parameters but fewer than said plurality of parameters.

11. The method of claim 1, wherein said at least one parameter comprises at least one of:
a parameter controlling an intensity of the emitted illumination, and
a parameter controlling a color of the emitted illumination.

12. The method of claim 1, wherein:
the first and second state each comprises a predefined lighting scene rendered by a plurality of illumination sources, the first state comprising a respective first value of at least one parameter of each of the plurality of illumination sources, and the second state comprising a respective second value of the at least one parameter for each of the plurality of illumination sources; and
said mapping further comprises mapping said second input to a respective adjustment defined at least in part based on the respective first and second values of said at least one parameter for each of the illumination sources; and
said adjusting comprises adjusting the at least one parameter by the respective adjustment for each of the illumination sources.

13. A non-transitory computer-readable storage medium comprising a computer program product having codes embodied thereon so as when run on one or more processing units, control illumination emitted by one or more illumination sources of a lighting system by performing operations of:
receiving from a speech recognition system a first input indicative of a first speech command recognized by the speech recognition system;
in response to the first input, controlling the lighting system to transition from a first state comprising a first value of at least one parameter of the emitted illumination to a second state comprising a second value of the emitted illumination of said at least one parameter;
receiving from the speech recognition system a second input indicative of a second speech command, the second input indicating that the second speech command specifies a further change in said at least one parameter of the emitted illumination relative to said transition;
mapping said second input to an adjustment of said at least one parameter of the emitted illumination defined at least in part based on the first and second values of the at least one parameter of the emitted illumination; and
controlling the lighting system to transition from the second state to a further adjusted state by adjusting the at least one parameter of the emitted illumination by said adjustment; wherein:
the second speech command specifies a direction of the further change but only relative to a direction of said transition, said second input indicating the relative direction; and
said mapping comprises determining a sign of the difference between the second and first values, and setting a sign of said adjustment accordingly.

* * * * *